(12) United States Patent
Harchanko

(10) Patent No.: US 7,701,652 B2
(45) Date of Patent: Apr. 20, 2010

(54) OPTICAL ELEMENT/DEVICE MOUNTING PROCESS AND APPARATUS

(75) Inventor: John S. Harchanko, New Market, AL (US)

(73) Assignee: MEMS Optical, Inc., Huntsville, AL (US)

( * ) Notice: Subject to any disclaimer, the term of this patent is extended or adjusted under 35 U.S.C. 154(b) by 783 days.

(21) Appl. No.: 10/665,530

(22) Filed: Sep. 22, 2003

(65) Prior Publication Data

US 2006/0050414 A1    Mar. 9, 2006

Related U.S. Application Data

(60) Provisional application No. 60/411,891, filed on Sep. 20, 2002.

(51) Int. Cl.
*G02B 7/02* (2006.01)

(52) U.S. Cl. .............. 359/819; 359/815; 359/821; 438/634; 438/738

(58) Field of Classification Search ............... 359/819
See application file for complete search history.

(56) References Cited

U.S. PATENT DOCUMENTS

| | | | |
|---|---|---|---|
| 5,963,577 A | 10/1999 | Snyder et al. | |
| 5,963,684 A * | 10/1999 | Ford et al. | 385/24 |
| 6,219,470 B1 | 4/2001 | Tu | |
| 6,716,409 B2 * | 4/2004 | Hafner et al. | 423/447.1 |
| 6,829,398 B2 * | 12/2004 | Ouchi | 385/14 |
| 6,861,363 B2 | 3/2005 | Harchanko et al. | |
| 6,949,405 B2 * | 9/2005 | Hagen | 438/106 |
| 7,006,426 B2 * | 2/2006 | Chiu et al. | 369/112.23 |

* cited by examiner

*Primary Examiner*—Jessica T Stultz
(74) *Attorney, Agent, or Firm*—Muncy, Geissler, Olds & Lowe, PLLC (57) ABSTRACT

A mounting process/device for mounting and alignment of micro optical electro-mechanical systems (MOEMS) elements and/or devices. The mounting process/device can be obtained by attaching at least one optical element onto a mounting system, which contains an embedded optical element. The attached optical element(s) are aligned with respect to the embedded optical element.

11 Claims, 8 Drawing Sheets

Related Art

OPTICAL ELEMENT/DEVICE MOUNTING PROCESS AND APPARATUS

This nonprovisional application claims priority under 35 U.S.C. §119(e) on U.S. Provisional Application No. 60/411,891 filed on Sep. 20, 2002, which is(are) herein incorporated by reference.

FIELD OF THE INVENTION

The present invention relates to micro optical electromechanical systems (MOEMS). In particular, the present invention is related to micro-lens mounting systems and alignment.

BACKGROUND OF THE INVENTION

The current trend in increased numbers of MOEMS has resulted in multi-lens systems, where accurate alignment and mounting become important for the function of a composite device. Current methods of fabricating MOEMS attach individual lens elements to separate mounting structure(s), requiring alignment of at least two lens elements and a mounting system. Alignment errors can result in MOEMS having optical signal degradation and decreased function.

Figure 1:
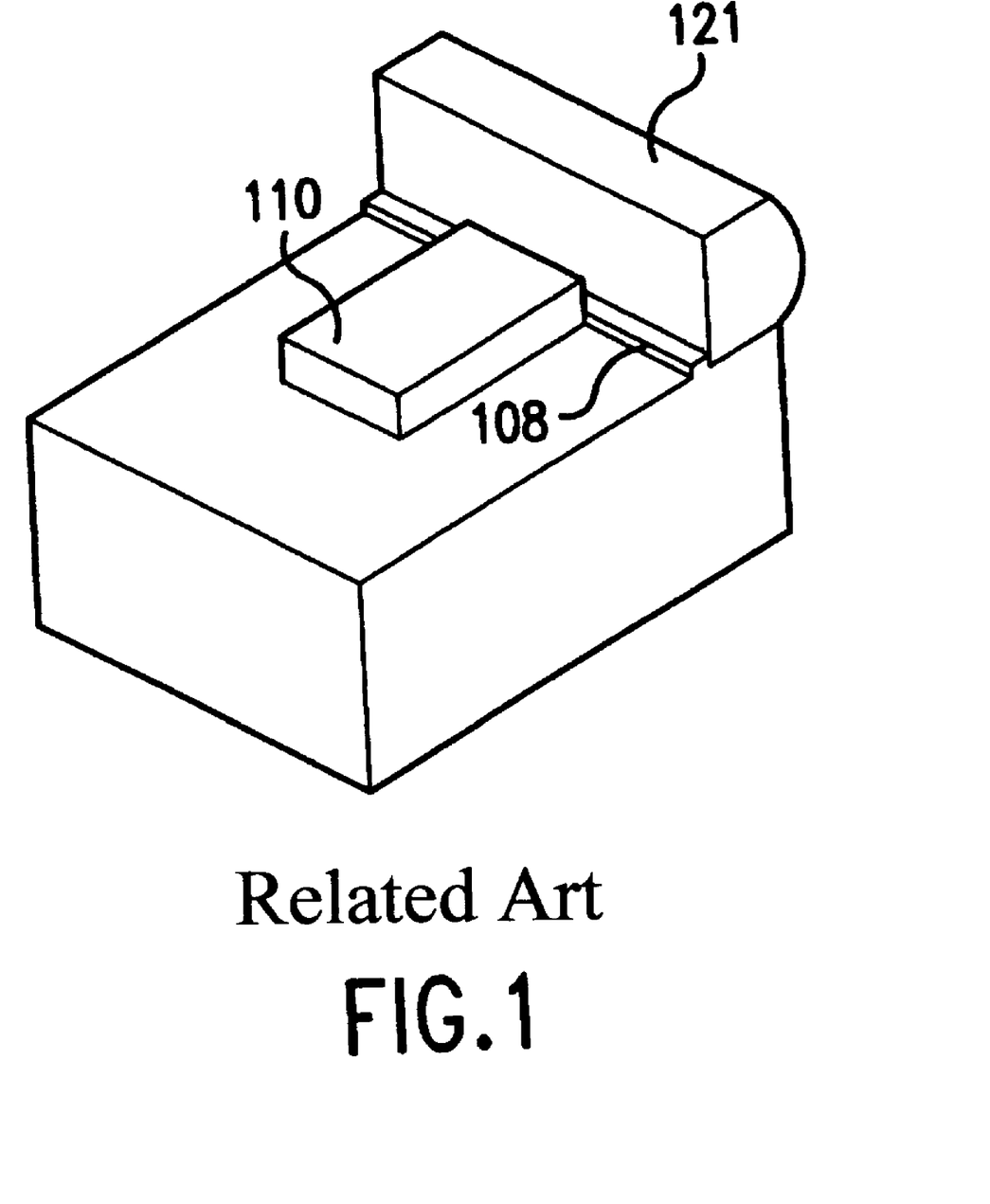
FIG. 1 shows a related art method of alignment.

FIG. 1 illustrates a related art method of micro-lens alignment and placement (U.S. Pat. No. 5,963,577 to Synder et al.) The device displayed is directed toward a multi element laser diode incorporating a cylindrical micro-lens. In Snyder, the placement of the laser diode 110 and the micro-lens 121 is set by use of a spacer 108. The laser diode 110 and the spacer 108 are soldered onto the micro-lens 121. The alignment of the micro-lens 121 and laser diode 110 with the spacer 108 typifies the disadvantages of current systems. All are separate elements and thus must be aligned independently. In FIG. 1, the separate nature of the elements can result in alignment errors of the micro-lens with the spacer, alignment errors of the laser diode with the spacer, and alignment errors between the laser diode and the micro-lens.

Figure 2:
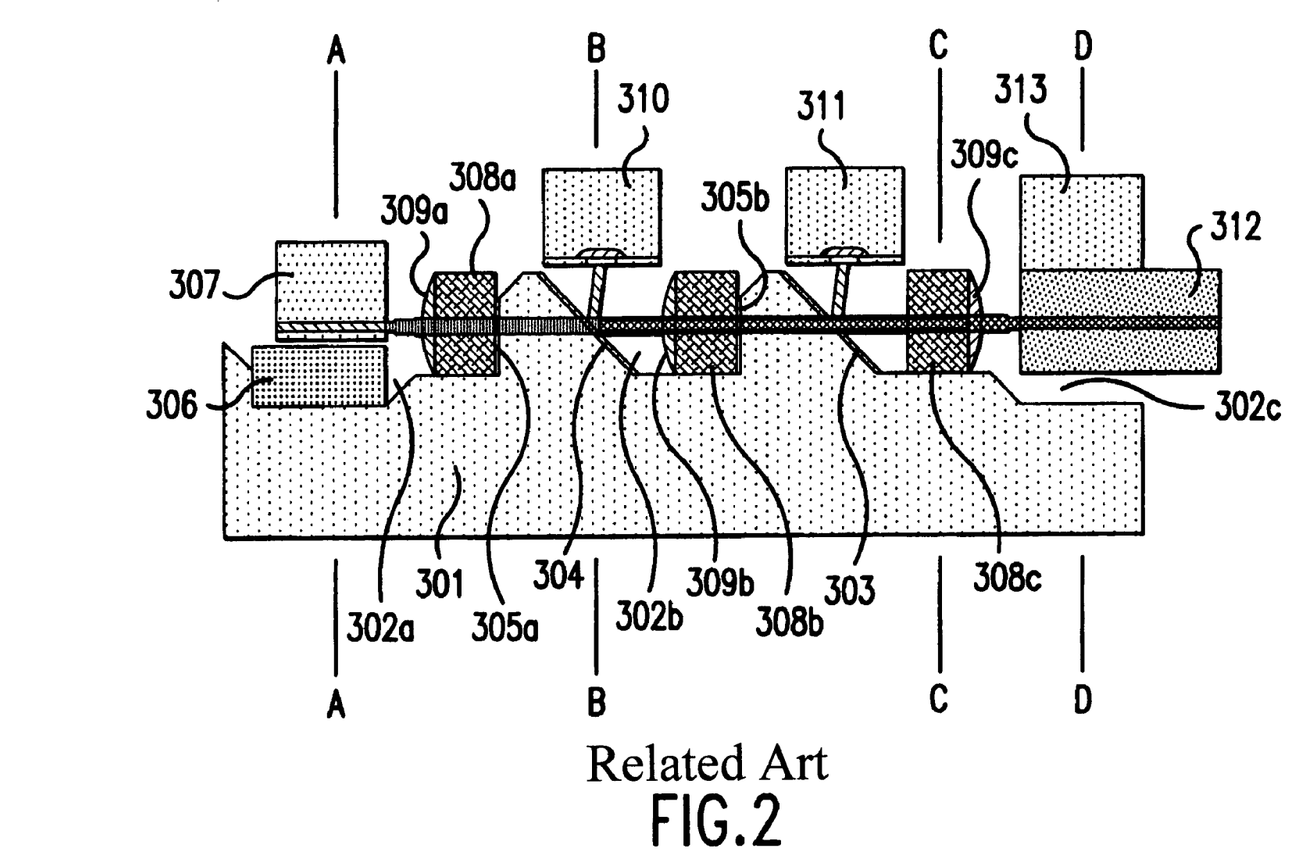
FIG. 2 is a diagram shows a related art method of lens alignment using etched structures.

FIG. 2 illustrates another related art system with multiple lenses and reflectors incorporated into a wavelength multiplexing transmitter and receiver module (U.S. Pat. No. 6,219,470 to Tu). A laser signal from a fiber optic cable 312 is wavelength separated by reflective surfaces 303 and 304, and wavelength dependent receivers 311 and 310 detect the separated wavelength signals. The reflective surfaces 303 and 304 are the result of multi-layer depositions on micro-machined grooves in the substrate material 301, which forms the base upon which the micro-lenses are attached. Tu again displays a disadvantage of current microlens mounting and alignment systems. The micro-lens 309A, 305B, and 309C are aligned separately, lending to the possible errors involved with individual alignment.

Alignment can be aided by using reference supports etched into the device showing where to place the optical elements. The etched supports can take the form of etched placement positions for placing previously formed micro-lens or can take the form of micro etched placement holes, micro pins, or other physical restraints and guide trenches. Although such holes, pins, and other physical constraints aid in alignment, alignment errors arise because the lenses must still be aligned individually.

SUMMARY OF THE INVENTION

In an exemplary embodiment of the present invention a micro-lens mounting system is provided where the mounting system and a reference micro-lens are integrated and serve as a mounting platform for the addition and alignment of microoptical elements. An additional exemplarly embodiment of the present invention provides the means for aligning multiple micro-optical devices.

In an exemplary embodiment of the present invention an optical element is embedded into mounting substrate(s), the mounting substrates can be etched to form an etched structure exposing a portion of the embedded optical element. The exposed optical element then serves as a reference point in the structure to which additional optical elements can be aligned. The etching can start from the opposite side to which the embedded optical element is attached to the mounting substrate(s) and results in the exposure of a portion of the embedded optical element resulting in an integrated mounting system. Optical devices can be attached to the mounting system allowing alignment with the embedded optical element. The integrated mounting system can also include a recess etch for the alignment of other micro-optical devices.

In exemplary embodiments of the present invention the lens can can be formed by processes known by one of ordinary skill (e.g. by grayscale etching techniques, reflow process, . . . ) and the mounting structure can be etched out of a mounting substrate using standard etch techniques (e.g wet etching, Reactant Ion Etching (RIE), Deep Reactant Ion Etching (DRIE), . . . ).

In exemplary embodiments of the present invention embedded lens and mounting substrate integration can be formed by direct etching of the lens from the mounting substrate, or before etching attachment via an adhesive layer, or anodically bonding of the lens to the substrate.

In exemplary embodiments of the present invention micro-optical elements attached to the integrated mounting system can be optical devices known to one of ordinary skill (e.g. lenses, waveguides, bi-refringent crystals, prisms, other micro-optical devices and mounting systems, . . . ).

In exemplary embodiments of the present invention etched structure(s) can be filled with a compound to change the index of refraction.

It is to be understood that both the foregoing general description and the following detailed description are exemplary and explanatory and are intended to provide further explanation of the invention as claimed. It should be understood that the detailed description and specific examples, while indicating exemplary embodiments of the invention, are given by way of illustration only, since various changes and modifications within the spirit and scope of the invention will become apparent to those skilled in the art from this detailed description. MOEMS optical devices and fabrication methods, which incorporate the features, described above constitute various exemplary embodiments of the present invention.

BRIEF DESCRIPTION OF THE DRAWINGS

The present invention will become more fully understood from the detailed description given herein below and the accompanying drawings, which are given by way of illustration only, and thus should not be interpreted to limit the present invention and wherein.

DETAILED DESCRIPTION OF THE PREFERRED EMBODIMENTS

As noted above, typical micro-optics integration and alignment have been based on separate lens alignment on a mounting system, which can result in alignment errors associated with the positioning of each lens.

In an exemplary embodiment of the present invention, a mounting system, etched from a mounting substrate surrounding an embedded lens, and a process for producing such mounting system, is provided.

A lens or multiple lenses can be embedded to a mounting substrate, that can be etched to receive the lens, by anodically bonding the lens to the mounting substrate, adhesively attaching the lens to the mounting substrate, or etching the lens directly from the mounting substrate, to form a mounting system. Many suitable attachments or bonding methods can be used to embed microlenses into the mounting substrates and the discussion herein should not be interpreted to limit the choices. Additionally the mounting substrate need not be etched to receive the lens to be embedded.

The mounting system can be etched from the mounting substrates, containing at least one embedded lens and at least one substrate layer, to expose at least one embedded lens and to provide structures upon which other microoptical elements or devices can be attached. The mounting substrates (e.g. Si, SiO2) can contain substrates that can be dry-etched (e.g. using DRIE) and/or wet etched (e.g. using HF). Many suitable alternating layers can be used to form the mounting substrates. The discussion herein should not be interpreted to limit the choices to Si or SiO2. In addition, many suitable etching techniques can be employed and the discussion herein should not be interpreted to limit the choices to wet or dry etching.

The etched mounting substrates, and embedded len(s) form a mounting system. The mounting system can itself contain etched recesses or other suitable methods for attaching other mounting systems or optical elements to the mounting system. Many suitable attachment techniques can be employed and the discussion herein should not be interpreted to limit the choices to etched recesses.

Figure 4A:
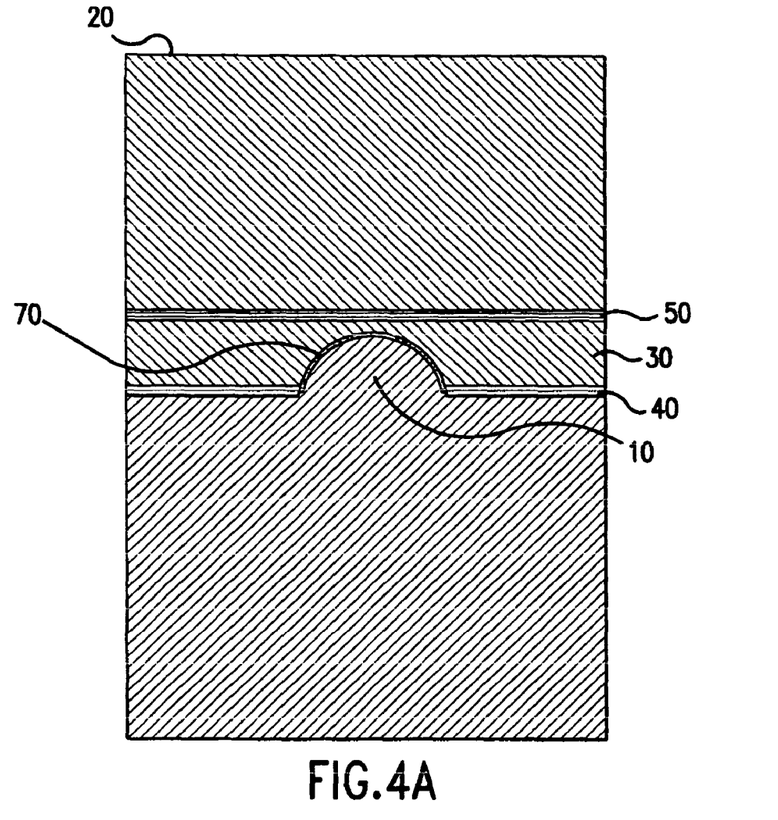
FIG. 4A is a diagram showing the combination of the micro-lens of FIG. 3A and the etched recess of FIG. 3B.
Figure 4B:
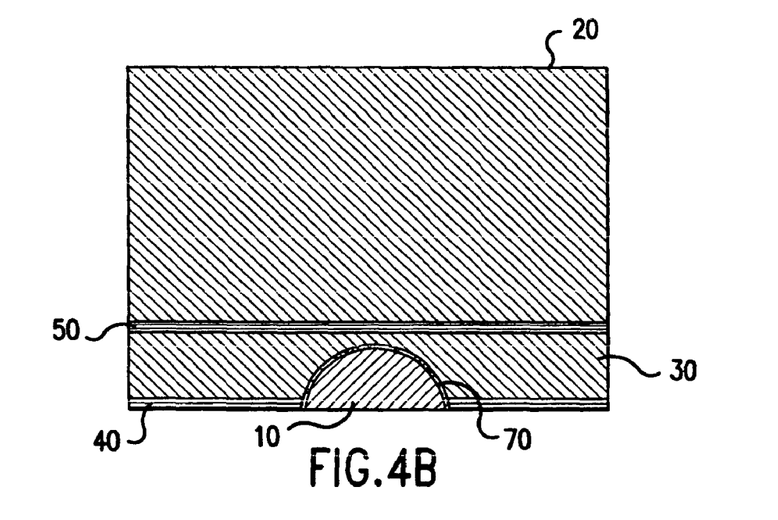
FIG. 4B is a diagram showing a ground and polished composite.
Figure 5A:
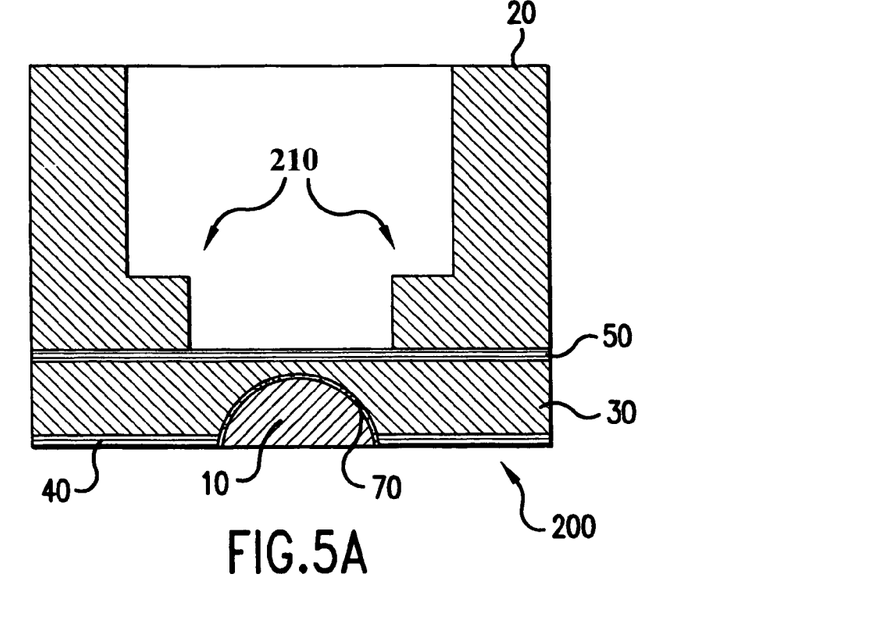
FIG. 5A is a diagram showing a two-level etched structure up to a first etch stop substrate.
Figure 5B:
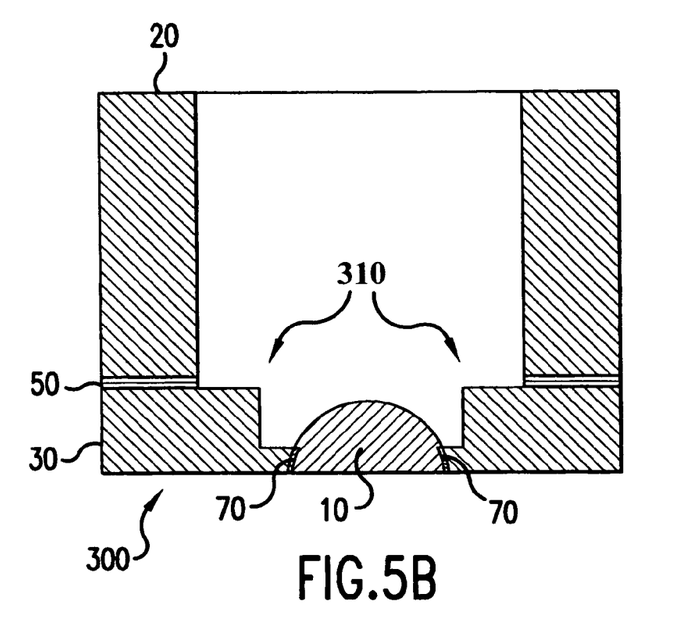
FIG. 5B is a diagram showing the exposure of the embedded microlens after etching.
Figure 6:
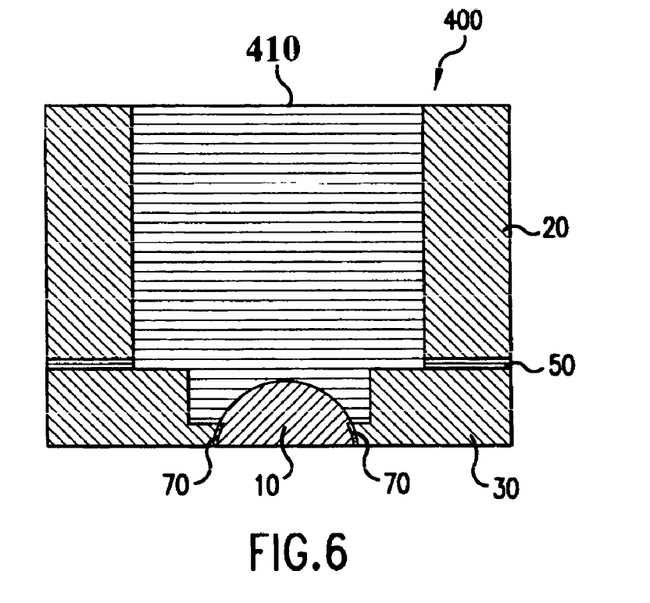
FIG. 6 is a diagram showing the mounting system of FIG. 3B with the etched structure filled with potting compound to modify the index of refraction within the system.
Figure 7:
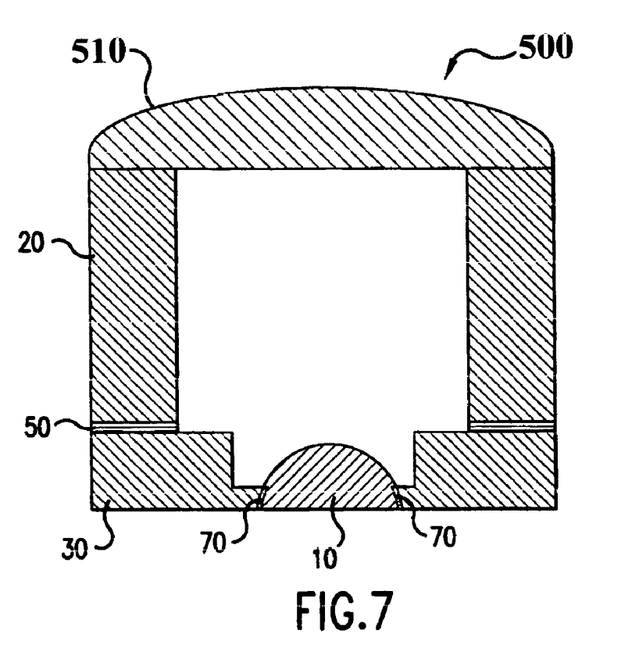
FIG. 7 is a diagram showing the mounting of a lens onto the mounting system of FIG. 5B.

A method to be described with reference to FIGS. 3A, 3B, 4A, 4B, 5A, 5B results in an exemplary embodiment of the present invention shown in FIG. 5B. FIG. 5B is a diagram illustrating a mounting system 300 containing an embedded micro-lens 10 (e.g. formed by etching a GaP substrate using grayscale or reflow processing). The mounting system 300 is formed by etching a multi-level structure 310 into several substrate layers 20, 30, 50 containing an embedded microlens 10. The multi-level structure 310 can be composed of an etched device substrate 20, an etch-stop substrate 50 and an etched second device substrate 30. The micro-lens 10 can be bonded to a recess in the support, substrate 30, by an adhesion layer 70 (e.g. Benzocyclobutene (BCB)). An additional lens can be attached to the mounting system as shown in FIG. 7. Additionally, the multilevel structure 310 can be filled with a potting material filler 410 (e.g. Epoxy-Master Bond EP19HT), varying the index of refraction, as shown in FIG. 6. In an exemplary embodiment of the present invention, the potting material is transparent to the wavelength of the optical light that at least one optical element is designed to operate with.

Figure 3A:
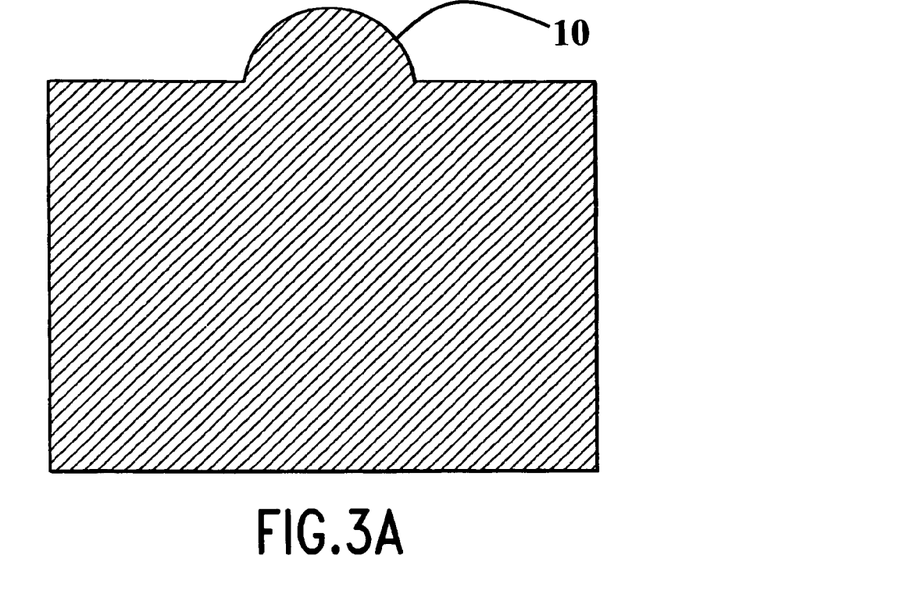
FIG. 3A is a diagram showing a micro-lens.
Figure 3B:
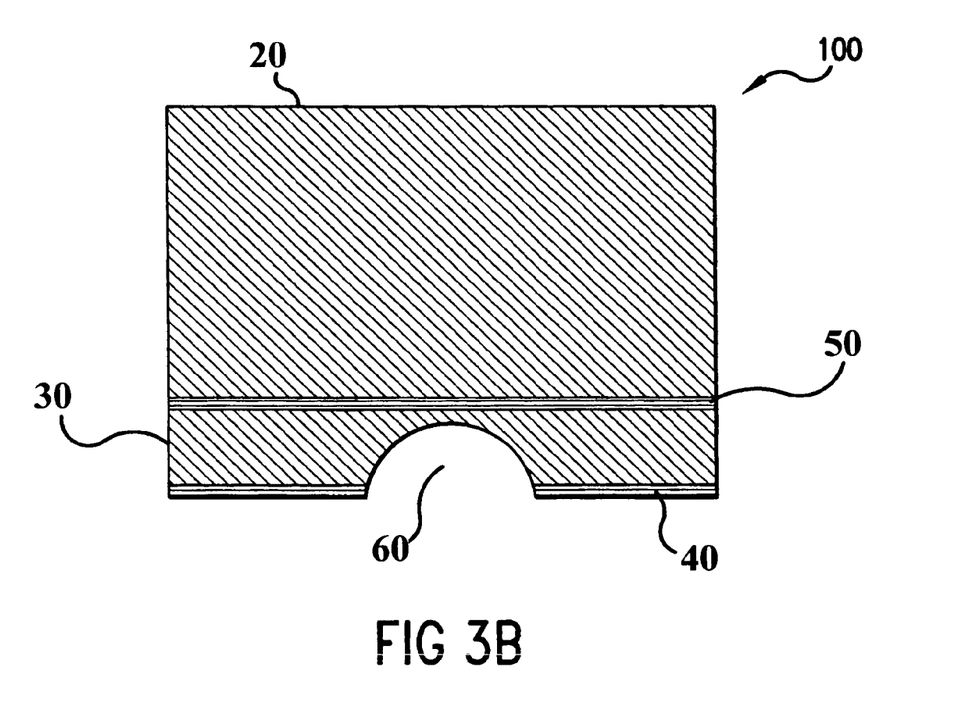
FIG. 3B is a diagram showing an etched recess for the micro-lens of FIG. 3A in a device mounting system.

A process in accordance with an exemplary embodiment of the present invention is shown in FIGS. 3A-5B. FIG. 3A is a diagram illustrating a micro-lens 10, having a base, that can be formed by grayscale etching, reflow or any other suitable process or lens substitute. The micro-lens 10 can be attached in a composite system of substrates that will form the mounting system. To accomplish the attachment or embedding, a composite of substrates 100, composed of several layers, is etched to form a recess(es) 60 to receive the micro-lens(es) 10 (FIG. 3B). The composite of substrates 100 is composed of a device substrate 20 (e.g. SOI), an etch-stop substrate 50 (e.g. SiO2), another device substrate 30, and a final etchstop substrate 40. The final etch stop substrate 40 and the device substrate 20 are etched (e.g. by a combination of grayscale processes and HF wet etching) to have a recess 60 that will accept the micro-lens 10. Preferably the recess(es) are conformal or at least partially conformal to the shape of the micro lens 10. In an exemplary embodiment of the present invention, the recess 60 can be formed by heating of the device substrate 30 and pressing the micro-lens 10 into the device substrate, forming the recess 60.

Once a composite of substrates 100 contains a recess for accepting the micro-lens 10, the composite of substrates and micro-lens can be attached. FIG. 4A is a diagram showing the combination of the micro-lens 10 and the composite of substrates 100. The micro-lens 10 can be bonded to the surface of the recess of the etched device substrate 30 by an adhesive layer 70 (e.g. Benzocyclobutene (BCB)). In an exemplary embodiment of the present invention, the micro-lens 10 can be bonded to the surface of the recess by heating the device layer 30 and pressing the micro-lens 10 into the device layer 30, forming the recess 60 in the process. The lens can alternatively be anodically bonded to the surface of recess of the device substrate 30 without an adhesive layer, other suitable methods of attachment or bonding are possible and the discussion herein should not be interpreted to limit the method of attachment of the micro-lens.

In the final mounting system, it may be desirable to only contain the curved portion of the microlens 10, as opposed to the base. This can be accomplished by etching or grinding and polishing the base of the microlens 10. FIG. 4B illustrates a remaining curve portion of a micro-lens after grinding and polishing. Other methods of removing the base from the curved portion of the micro-lens are possible and the discussion herein should not be interpreted to limit the method of removing the microlen's base.

Once the microlens 10 has been embedded into the composite of substrates 100, the mounting structures for additional optical elements can be etched into the mounting substrates. FIG. 5A is a diagram illustrating a multi-level structure 210 etched from the composite of substrates, resulting in the mounting device 200. The two-level etch shown can be accomplished using RIE, DRIE or any other etching technique, including wet etching, that may be appropriate for the materials used. The etch used stops at the etch stop substrate 50. The details of selectively etching with etch stops, wet etching, and dry etching to achieve multiple levels is shown in co-pending application Ser. No. 10/209,918 whose entire content is incorporated by reference in its entirety.

In an exemplary embodiment of the present invention, the substrate material used for the composite of substrates is silicon. However, the substrate can be selected from any number and combination of materials, for example, silicon, Ge, GaAs, GaSb, plastic, glass, quartz or metals such Cu, Al, InSb, InAs, InP, CdTe, and PbTe. Other suitable materials can be substituted and the discussion herein should not be interpreted to limit the invention.

In exemplary embodiments of the present invention the lenses can have various index of refractions depending upon the intended use. The lenses used can be high index of refraction lenses or low index of refraction lenses made out of suitable material (e.q. GaP, glass, plastic, and the like) and the discussion herein should not be interpreted to limit the material used for the optical elements.

As previously mentioned, wet and/or dry etching or any other suitable removal process can be used to accomplish the etching of the composite of substrates to achieve multi-level structures in accordance with exemplary embodiments of the present invention.

Wet etching depends upon substrate material. If $SiO_2$ is used as a substrate material then $HF+H_2O$ is a wet etchant that can be used. If the substrate is Si then wet etchant "HNA", a mixture of hydrofluric acid (HF), nitric acid ($HNO_3$), and acetic acid ($CH_3COOH$) can be used. Dry etching uses plasmas to etch patterns in a substrate. Various methods of etching and associated chemicals and materials are shown in Table 1. Other suitable methods can be used and Table 1 should not be construed as limitative of the etch materials available.

attached to the mounting system 300. FIG. 6 illustrates a mounting device 400 using a method of varying the index of refraction of the composite system by filling the multi-level structure 310 with a potting compound 410 (e.g. Epoxy-Master Bond EP19HT) having an index of refraction. In an exemplary embodiment the potting compound 410 can be transparent to a desired optical wavelength. Other potting index of refractions or method of varying the index of refraction can be used and the discussion herein should not be interpreted to limit the method or range (high or low index of refraction) of altering the index of refraction within the multi-level structure 310.

Once a mounting system 300 or 400 has been formed, other lenses can be attached to the mounting system. The lenses can be attached in similar manners as discussed above for attaching microlens 10 or can be attached by some physical means. FIG. 7 illustrates the attachment of a lens 510 to the mounting system 300 of FIG. 5B. In an exemplary embodiment a glass lens 510 is anodically bonded to the mounting device at the surface of the device substrate 20. The multi-lens device 500 includes an exposed, embedded, micro-lens 10 with a multi-level structure formed by etching substrates 20, 30, and 50. Other multiple levels are possible as well as other attachment lenses or structures and the discussion herein should not be interpreted to limit the type of optical devices attached to the mounting system nor the particular level of structuring nor should one limit the material that the lens 510 is composed of.

Figure 8:
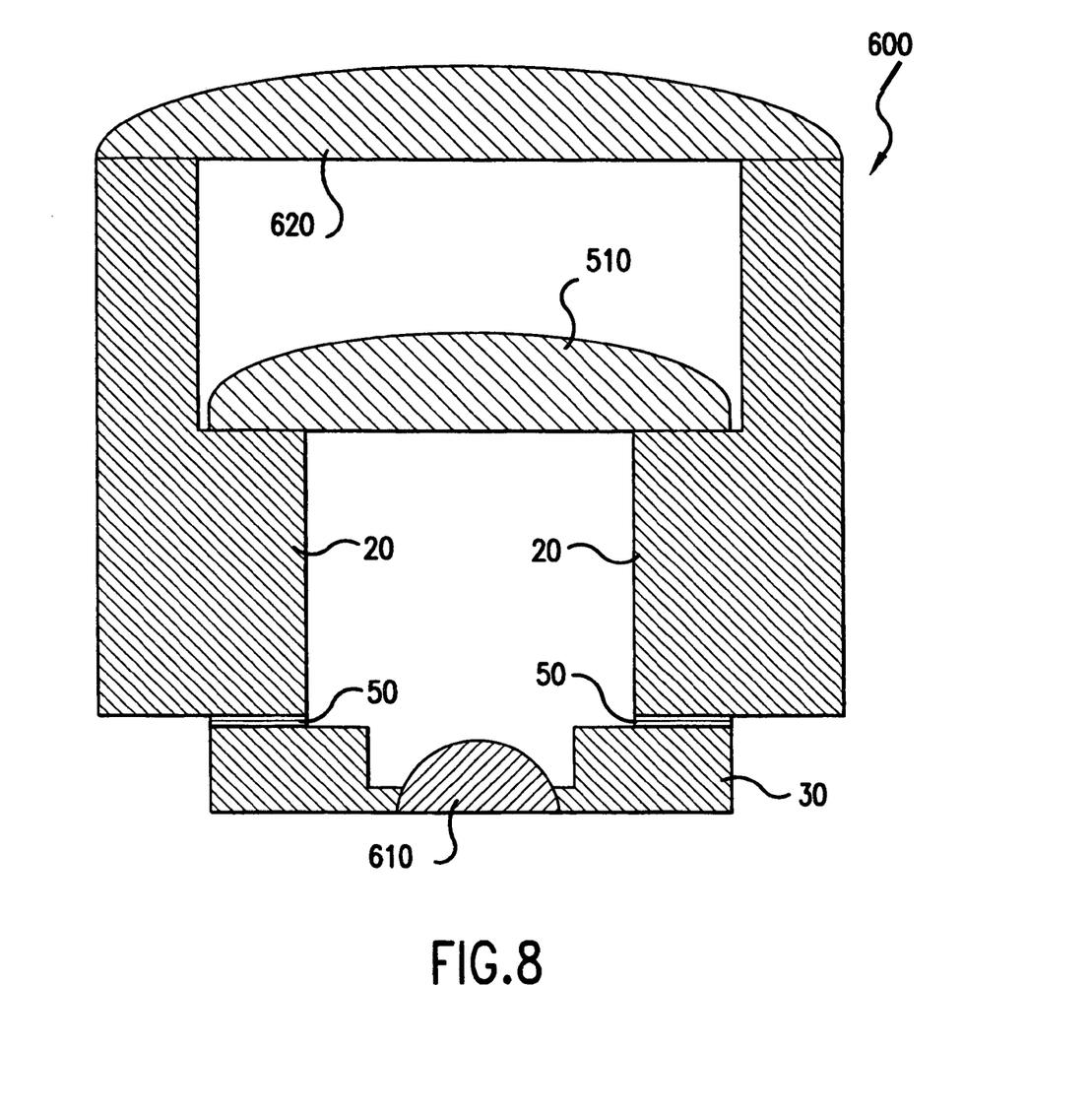
FIG. 8 is a diagram showing the mounting of multiple lenses onto a mounting system.

The methods described herein can be used to attach many optical elements to the mounting system 300 or 400. FIG. 8 illustrates the attachment of two optical lenses to a variation of the mounting system 300. In the variation of mounting system 300 two levels have been etched to receive optical elements. Lens 620 is attached to an upper level and lens 510

TABLE 1

Comparison of wet and dry etchants and their etch rates in certain substrates.

| Etchants | HNA (HF + HNO3 + Acetic Acid) | Aikali-OH | EDP (ethylene-diamine pyrochatechol) | TMAH (tetramethyl-ammonium hydroxide) | XeF2 | DRIE Etching |
|---|---|---|---|---|---|---|
| Etch Type | wet | wet | wet | wet | Dry | dry |
| Anisotropic | no | yes | yes | yes | No | yes |
| Si-Etch Rate, μm/min | 1 to 3 | 1 to 2 | 0.02 to 1 | ~1 | 1 to 3 | >1 |
| Nitride Etch | low | low | low | ~1 nm/min | Low | low |
| Oxide Etch nm/min | 10 to 30 | 1 to 10 | 1 to 80 | ~ | low | low |

Once the structure 210 of FIG. 5A has been etched to the etch stop substrate 50 the etch stop substrate 50 can be removed. Removal of the etch stop substrate 50 can be accomplished by several suitable methods, for example if the etch stop substrate is $SiO_2$ the layer can be removed by wet etching with $HF+H_2O$. The embedded microlens 10 is then exposed via continued etching. FIG. 5B is a diagram showing the final multi-level etch structure 310 of the mount system 300 exposing the micro-lens 10 with the exposed adhesive layer etched leaving only the non exposed adhesive layer 70 (e.q. using a DRIE etch). The embodiment of the mounting system 300 shown in FIG. 5B can be additionally augmented by varying the index of refraction within the multi-level structure 310 by adding a potting compound. A varying index of refraction may be desirable depending on the index of refraction of the microlens 10 and any other optical systems is attached to a lower etched level in the structure. The void regions between the 510, 610, and 620, lenses can be filled with potting compound(s) to change the indices of refraction. Other structures and/or optical elements can be attached to the structure of the variation of mounting system 300 and other structures can be etched to receive optical elements, and thus the discussion herein should not be interpreted to limit the structure etched or optical elements attached to the mounting system.

Figure 9:
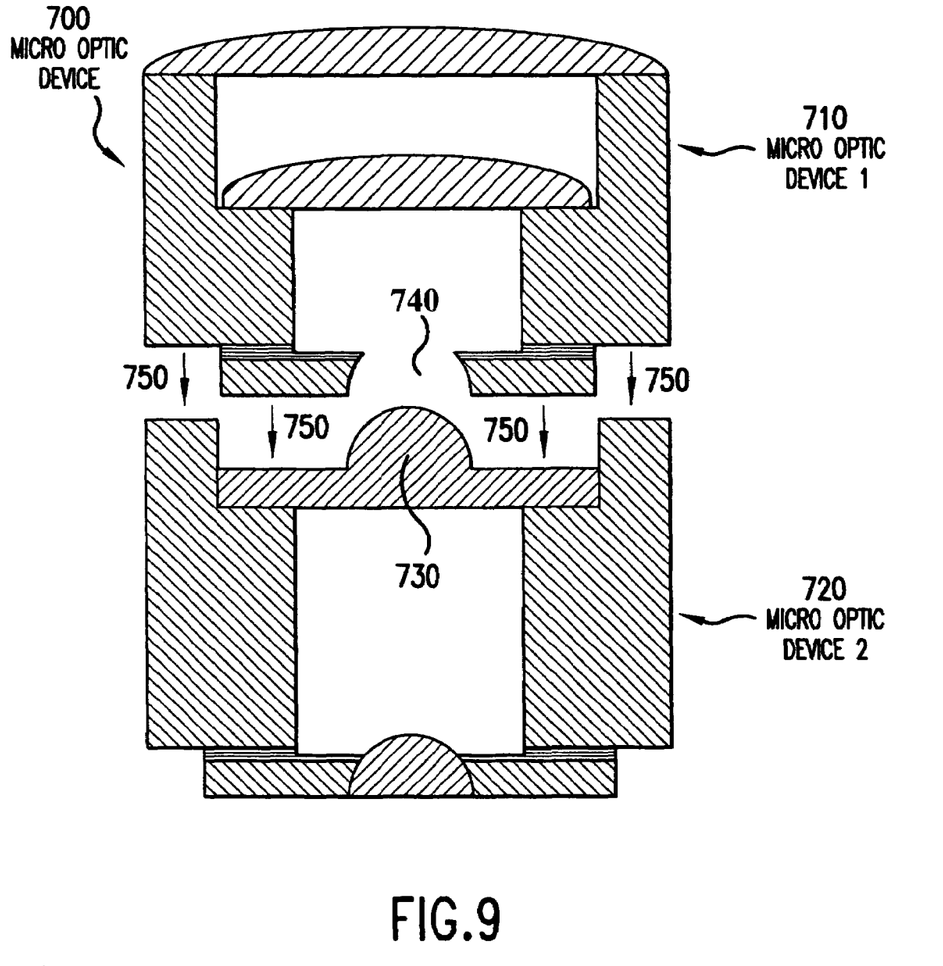
FIG. 9 is a diagram showing the alignment and attachment of two micro-optical devices using an embodiment of the method described within.

The discussion herein has focused on methods of creating mounting systems and attaching multiple optical systems and devices to the mounting systems in accordance with exemplary embodiments of the present invention. Another embodiment of the present inventive method is to attach separate devices via similar techniques. FIG. 9 illustrates the attachment of a first micro-optic device 710 to a second micro-optic device 720 via the use of an etched recess 740 in the first micro-optic device 710. The recess 740 conformably or partially conformably fits the micro-lens 730 of the second micro-optic device. The two devices 710 and 720 are attached 750. The attachment can be similar to the methods for attachment of microlens 10 to the mounting substrate layers as discussed above or some other suitable method of attachment. Thus, the discussion herein should not be interpreted to limit the method of attachment. Additionally the recess 740 need not be limited to only one recess that accepts a lens. Other recesses can be etched in the mounting system to accommodate alignment and attachment of the two devices and discussion herein should not be interpreted to limit the number of recesses and the number of devices attached.

Other appropriate micro-lens materials, filler materials, adhesive layers, etch techniques and other processes and materials can be used in the inventive process and the discussion above should not be interpreted to limit the scope of the invention.

I claim:

1. A multi-optical element device comprising:
   a reference optical element;
   a mounting system, wherein said mounting system is formed by etching substrate(s) to form a recess to receive the reference optical element, where said recess at least partially conforms to the shape of said reference optical element, and where said reference optical element is attached to said recess in said substrate, said mounting system contains etched substrate(s) forming etched structures upon which optical devices can be attached;
   at least a first optical element attached to a predetermined structure of said etched structures, wherein said etched structure is covered with a filling compound to change the index of refraction.

2. The multi-optical element device according to claim 1, wherein said reference optical element and/or said first optical element are made from glass.

3. The multi-optical element device according to claim 1, wherein said reference optical element and/or said first optical element are made from GaP.

4. The multi-optical element device according to claim 1, wherein the filling compound is Epoxy-Master Bond EP19HT.

5. The multi-optical element device according to claim 1, wherein the size of said reference and first optical elements are between 1 meter and 1 nanometer.

6. The multi-optical element device according to claim 1, wherein the size of said reference and first optical elements are between tens of centimeters and 1 nanometer.

7. The multi-optical element device according to claim 1, wherein the size of said reference and first optical elements are between several millimeters and 1 nanometer.

8. The multi-optical element device according to claim 1, wherein the reference optical element and the first optical element are aligned along substantially the same optical axis.

9. The multi-optical element device according to claim 1, wherein the reference optical element and the first optical element are aligned in a substantially perpendicular direction with respect to a line through the center of each optical element.

10. The multi-optical element device according to claim 1, wherein the reference optical element is a lens having a convex surface and wherein said recess has a curved shape to at least partially conform to the convex shape of said reference optical element.

11. A multi-optical element device comprising:
    a reference optical element;
    a mounting system, wherein said mounting system is formed by etching substrate(s) to form a recess to receive the reference optical element, where said recess at least partially conforms to the shape of said reference optical element, and where said reference optical element is attached to said recess in said substrate, said mounting system contains etched substrate(s) forming etched structures upon which optical devices can be attached;
    at least a first optical element attached to a predetermined structure of said etched structures,
    wherein said etched structure forms a cavity and wherein said reference optical element is located inside said cavity and the filling compound is used to fill said cavity.

* * * * *